(12) United States Patent 
Sanz Pascual et al.

(10) Patent No.: US 11,976,627 B2
(45) Date of Patent: May 7, 2024

(54) FAIRING FOR A MODULAR BLADE

(71) Applicant: NABRAWIND TECHNOLOGIES, SL, Pamplona (ES)

(72) Inventors: Eneko Sanz Pascual, Pamplona (ES); Javier Callen Escartín, Huesca (ES); Javier Monreal Lesmes, Zizur Mayor (ES); Ana Fernández García, Valdemoro (ES)

(73) Assignee: NABRAWIND TECHNOLOGIES, SL, Pamplona (ES)

( * ) Notice: Subject to any disclaimer, the term of this patent is extended or adjusted under 35 U.S.C. 154(b) by 0 days.

(21) Appl. No.: 18/005,239

(22) PCT Filed: Jul. 22, 2020

(86) PCT No.: PCT/ES2020/070474
§ 371 (c)(1),
(2) Date: Jan. 12, 2023

(87) PCT Pub. No.: WO2022/018306
PCT Pub. Date: Jan. 27, 2022

(65) Prior Publication Data
US 2023/0265827 A1 Aug. 24, 2023

(51) Int. Cl.
*F03D 1/06* (2006.01)
*F03D 80/30* (2016.01)

(52) U.S. Cl.
CPC .......... *F03D 1/0675* (2013.01); *F03D 80/30* (2016.05); *F05B 2240/302* (2013.01);
(Continued)

(58) Field of Classification Search
None
See application file for complete search history.

(56) References Cited

U.S. PATENT DOCUMENTS 7,334,989 B2 * 2/2008 Arelt .................. F03D 1/0675
416/229 R
8,172,493 B2 * 5/2012 Tobergte ................. F03D 13/40
410/44

(Continued)

FOREIGN PATENT DOCUMENTS

EP 2865890 A1 4/2015
GB 2465975 A 6/2010

OTHER PUBLICATIONS

International Search Report and Written Opinion issued on Sep. 24, 2020, in corresponding International Application No. PCT/ES2020/070474, 12 pages.

*Primary Examiner* — Juan G Flores
(74) *Attorney, Agent, or Firm* — Maier & Maier, PLLC (57) ABSTRACT

A fairing for a modular blade of a wind turbine generator, comprising including a joining zone disposed between two consecutive modules of the modular blade. The fairing is comprised of different components; the suction side fairing, the pressure side fairing and auxiliary components, such as tabs to facilitate the joining of the components. The leading edge fairing and the trailing edge fairing are constituted of an elastomeric material, preferably silicone, supported in a rigid glass fibre framework in order to absorb the warping experienced by the blade during the operation thereof. The attachment elements employed to join the fairings together and to the setbacks of the blade shell are rivets or similar. All the fairings incorporate the metal elements necessary to be equipotentially bonded, being linked to the lighting down-drop.

15 Claims, 6 Drawing Sheets

(52) U.S. Cl.
CPC ... *F05B 2240/303* (2020.08); *F05B 2240/304* (2020.08); *F05B 2260/301* (2013.01); *F05B 2280/2003* (2013.01)

(56) References Cited

U.S. PATENT DOCUMENTS

| | | | |
|---|---|---|---|
| 2006/0127222 A1* | 6/2006 | Arelt | F03D 1/0675 416/224 |
| 2010/0272570 A1* | 10/2010 | Arocena De La Rua | F03D 80/30 416/146 R |
| 2012/0141287 A1* | 6/2012 | Hynum | F03D 1/0675 416/235 |
| 2019/0383262 A1 | 12/2019 | Van Kalken | |

* cited by examiner

Fig. 1

Fig. 2 – Cross-section deformeded shape

Fig. 6 – section CD

FAIRING FOR A MODULAR BLADE

FIELD OF INVENTION

The present invention is directed to modular blades of wind turbine generators and more specifically to blades consisting of two or more modules that are assembled in situ and wrapped with a fairing to aerodynamically cover the existing gap due to the joint.

BACKGROUND

The blades are generally made of composite materials, such as carbon fibre, and suffer warping during their operation, heavy warping in cases of extreme conditions. The tip flexes due to the thrust of the wind and the blade twists, warping its profile. This particularly harms the fairing that covers the gap that originates in a modular blade.

By studying the state of the art in the search for greater aerodynamic performance of the blade, it is concluded that the modification of the profile is one of the most adopted solutions to avoid overloads in operation. This is mainly achieved by making the elements that make up the profile of the blade more flexible. Such is the case of patent application WO2018100401A1 that uses an external flexible skin that is complemented by an internal support structure. The flexible outer skin slides over the trailing edge without forming wrinkles or discontinuities. The internal support structure is attached to the blade beam and to rotating shafts that change the geometry of the blade based on load sensors and rotation controllers. Patent application DE102010047918A1 makes the trailing edge more flexible with pneumatic actuators attached to a fixed part of the wing and attached to a flexible trailing edge, simplifying the actuators and mechanical components to the maximum. Patent application DE10233102A1 describes a flexible trailing edge connected to a pressure medium such as compressed air. The trailing edge is made of a fluoropolymer that can be welded to the blade at its widest end, the rest of the element being a stable but flexible support. And lastly, patent US 2008107540 shows how damping elements are glued with adhesive on the leading edge, on the trailing edge, and even on the internal webs of the blade. The elements include a laminated material made of a viscoelastic layer and a rigid layer adhered to the viscoelastic layer. They are arranged externally or internally and cover practically the entire blade.

All these solutions are intended for long blade lengths, not for a fairing that covers a pre-established gap. The requirements of the fairing do not require complex complementary elements of the mentioned patents. These complex complementary elements are added to the trailing edge of the blade, increasing its aerodynamic response and minimizing noise.

SUMMARY

It is an object of the invention to cover the gap existing at the joint of a modular blade with a fairing. The hole has a specific shape and size such that it can allow access to an operator or his tools during assembly carried out on site. The fairing is comprised of different components and each one of them has its own size, shape and auxiliary accessories, such as tabs, to facilitate their union between components as well as with the blade shell. All this ensuring aerodynamic continuity in the profile and hermetic closure by means of rivets or similar elements.

Another object of the invention is to replace some of the fairings used to cover the joining area of the modular blade, giving the new fairings the particularity of being able to absorb the warping experienced by the blade during the operation thereof. For this, the trailing edge fairing and the leading edge fairing are made of a flexible material, of the elastomer type, which absorbs to a greater extent the aforementioned warping experienced in the direction of the chord. An elastomeric material is a type of compound that includes non-metals in their composition and that show elastic behaviour. Silicone as an inorganic polymer derived from polysiloxane is the preferred material.

Another object of the invention is to incorporate the necessary metal elements so that the entire faring is equipotentially bonded being linked to the lighting down-drop. The problem of leaving conductive elements isolated is the high potential difference that is created between them due to the induction phenomena caused by the lightning as it passes through the lightning protection system.

The fairing object of the invention must be perfectly integrated, that is, aligned with the shells both in the chord direction and in the span direction, providing aerodynamic continuity to the blade and closing a very small gap with respect to the total length of the modular blade.

BRIEF DESCRIPTION OF THE DRAWINGS

A brief description will be given below for a series of drawings useful for better understanding the invention and that expressly relate to an embodiment of said invention that is presented as a non-limiting example thereof.

DETAILED DESCRIPTION

Figure 1:
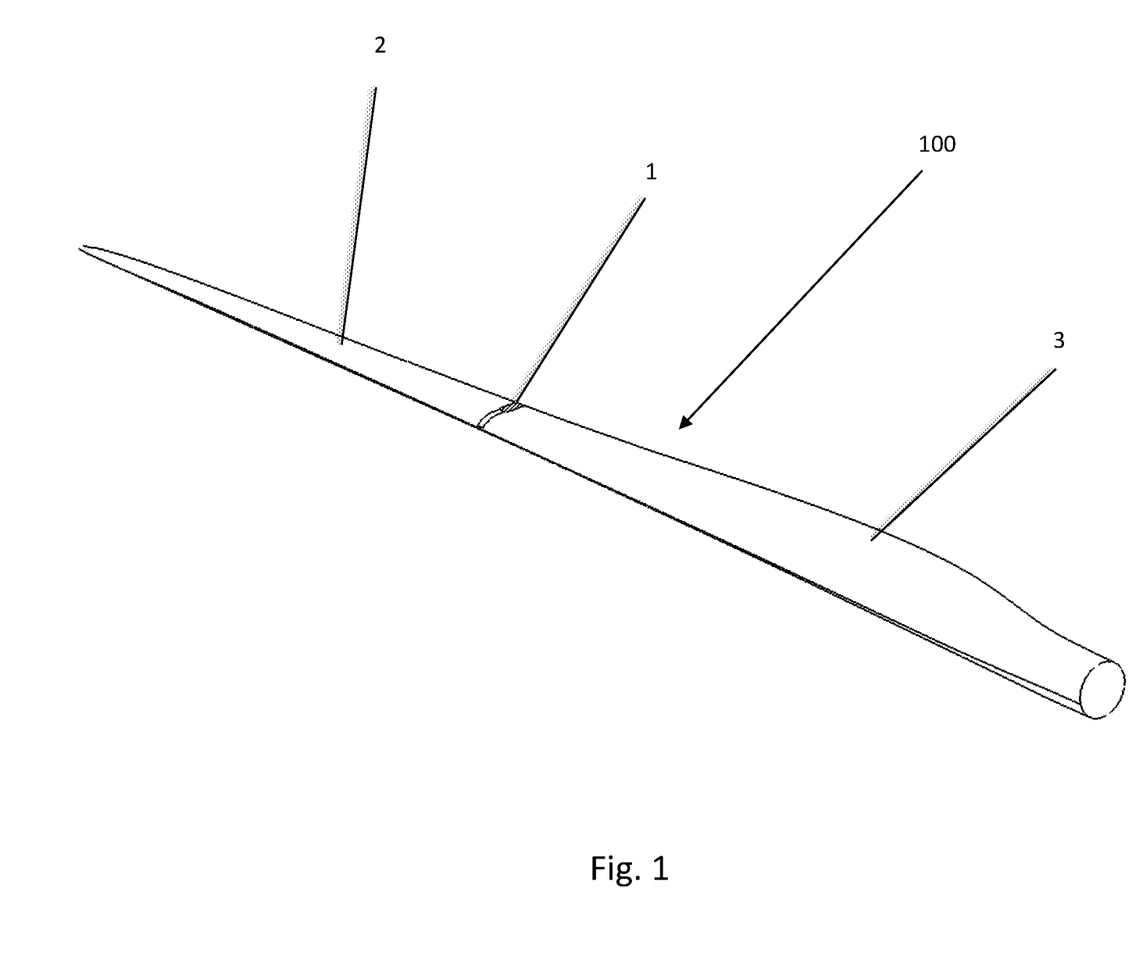
FIG. 1 shows a perspective view of the modular blade.

As shown in FIG. 1, the modular blade (100) comprises a joining zone (1) separating the blade (100) into two parts: the tip of the blade (2) and the root of the blade (3). The modularization of the blades is applied to large size blades where the transport of the integral blade becomes very complex or practically impossible. On the contrary, the joining zone (1) is very small so as not to penalize with unnecessary weight to the modular blade (100). All this results in a very small joining zone (1) compared to the total length of the blade (100). The joining zone (1) of the modular blade (100) is wrapped with a fairing (200) that aerodynamically covers the gap existing in the joining zone (1). For blades of around 70 m, the fairing (200) of the invention represents between 0.5 and 1% of the length of the modular blade (100).

Figure 2:
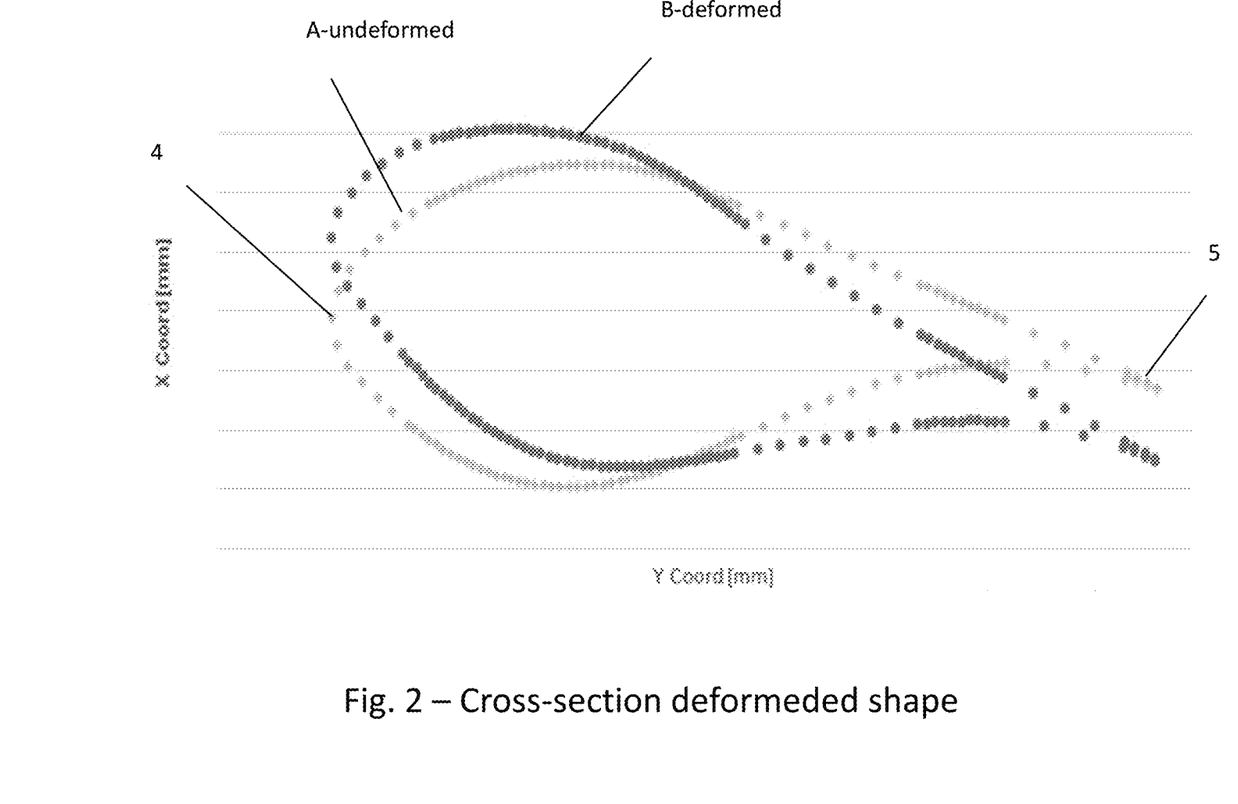
FIG. 2 represents the warping suffered by the blade during its operation.

FIG. 2 shows the profile of the blade and the warping suffered by the leading edge (4) and the trailing edge (5) during the blade operation. The abscissa and ordinate axes show the warping in mm. The lighter dotted profile (A) represents the profile of the blade without warping and the darker dotted profile (B) is when it is warped due to the loads that the blade undergoes during the operation thereof. To absorb said warping, the fairing (200) of the invention comprises a leading edge fairing (19) made of elastic material and a trailing edge fairing (20) made of elastic material, as discussed below.

Figure 3A:
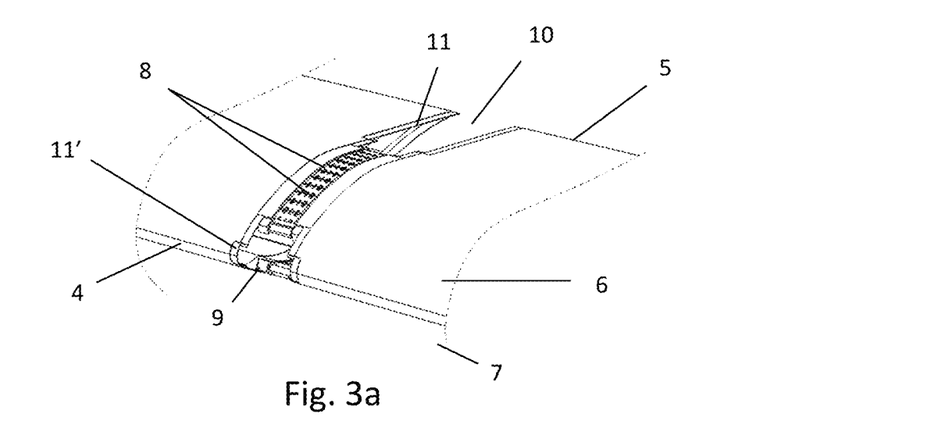
FIG. 3a shows the union of the two modules of the blade, without fairing.

FIG. 3a details the joining of the modular blade (100), by clearly indicating the different points of the profile of a blade: the leading edge (4), the trailing edge (5), the suction side (6) and the pressure side (7). The metal joint extends over a good part of the surface of the suction side (6) and the pressure side (7). Said metal joint is formed by a series of threaded bolts inside inserts that are covered with elements (8) called Xpacer® and which are responsible for prestressing the aforementioned bolts. The hole (9) presented in the leading edge (4) and the hole (10) in the trailing edge (5) are larger than the hole that houses the Xpacer elements (8) in order to facilitate access to placement and tightening of said metallic elements that make up the joint. All the holes (9, 10) have a step or setback (11, 11') with respect to the surface of the blade shell to fit the different components that make up the fairing (200).

After the metal bonding is complete, all gaps must be covered. To do this, it is covered with a fairing comprising different parts: the leading edge fairing (19), the suction side fairing (12), the pressure side fairing (13) and the trailing edge fairing (20). This last fairing of the trailing edge (20) is made up of two components (20', 20") joined by one of its sides, as will be explained below. The leading and trailing edge fairings (19, 20) have a support in the form of a rigid perimeter framework (21). The fairings on the suction side (12) and on the pressure side (13) only have through holes to receive the fixing elements and join the blade shell at their ends. This avoids the places where the Xpacer elements (8) and their corresponding threaded bolts are located inside the inserts. The leading edge (19) and trailing edge (20) fairings have holes all around their periphery. In addition to the aforementioned fairings, there are two tabs (15) to complete the joining of the leading edge fairing (19) with the suction side (12) and the pressure side (13) fairing and two other tabs (16) to complete the joining of the two components (20', 20") of the trailing edge fairing (20) with the suction side (12) and pressure side (13) fairing, as shown in exploded view in FIG. 3b.

Figure 3B:
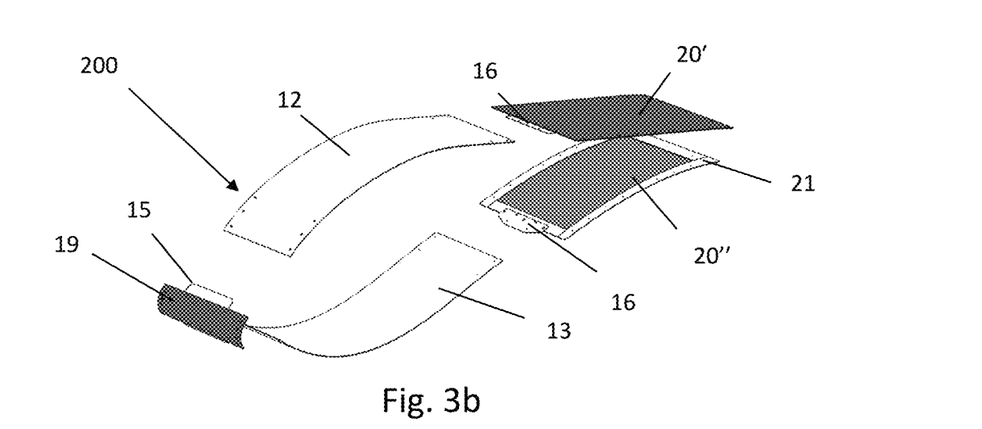
FIG. 3b shows an exploded view of the fairing of the modular blade.
Figure 3C:
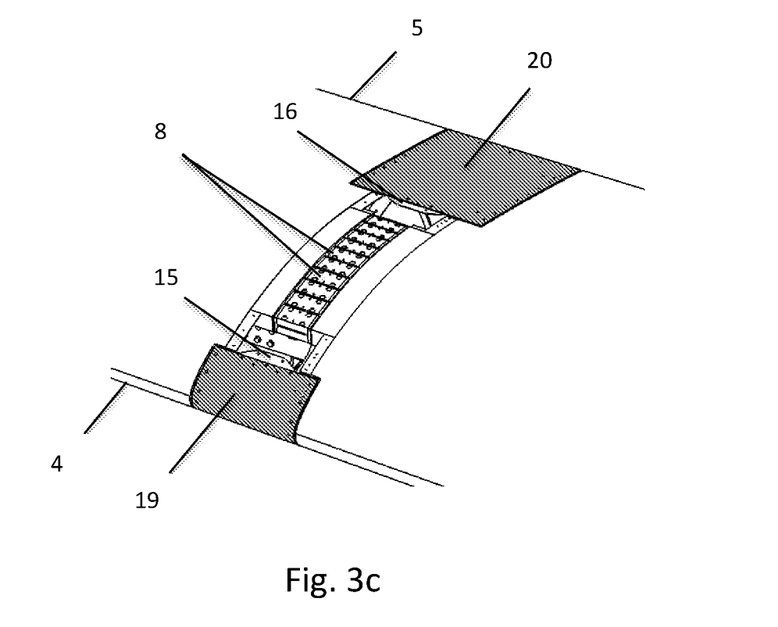
FIG. 3c is a perspective view of the joint, only with the fairings of the leading edge and the trailing edge.
Figure 3D:
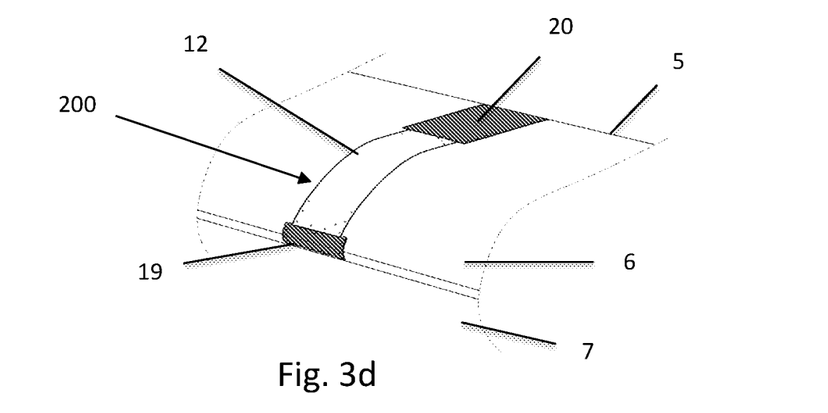
FIG. 3d shows the fairing completely assembled on the joint of the modular blade of FIG. 1.

FIG. 3c shows the leading edge fairing (19) and the trailing edge fairing (20) made entirely of elastic material. These elastic or elastomeric elements have through holes all around their periphery that are traversed by the fixing elements, preferably rivets, for their connection with the blade shells (100).

The rigid framework (21) of the leading edge fairing (19) supports the elastomeric material, either surrounding at least two sides of the element made of elastomeric material or placed below said element made of elastomeric material, said framework (21) being suitable for covering the setback (11') of the shell of the modular blade (100) shown in FIG. 3a.

The elastomeric material is preferably silicone and is reinforced with a rigid glass fibre framework (21), withstands temperatures in the range of −40° to +50° and is resistant to environmental humidity. All fairings can be painted with a gel-coat like the rest of the blade. Both fairings (19, 20) are attached to the blade with fixing elements, preferably rivets or the similar.

To house said fixing elements, metal inserts or bushings are used which are arranged on the periphery of the fairings (19, 20) passing only through the rigid framework (21) or passing through the elastomer material itself and the rigid framework (21). Said metal inserts or bushings equipotentially bond the fairings (19, 20) made of elastomer material when joining the lightning down-drop.

As shown in FIGS. 4, there are different configurations of the trailing edge fairing (20). Depending on the access to the metal elements that make up the joint of the modular blade, the hole (10) of the trailing edge (5) may change its size. For access and assembly in the direction of the chord (sideways to the blade, when it is laid horizontally) the fairings of the trailing edge are as shown in FIGS. 4a, 4b and 4c. For access and assembly from above the blade, the fairing will be narrower, as shown in FIG. 4d. In all the cases represented, the leading edge fairing (19), the suction side fairing (12) and its counterpart on the pressure side (13) will remain unchanged in size. In the first embodiment, FIG. 4a, the trailing edge fairing is formed by a rigid framework (21) made of glass fibre that covers practically the entirety of the hole it covers and by an elastic central part (20a) of equal length and similar width to each side of the rigid framework (21) that incorporates a double line of through holes to receive the rivet-type fixing elements. In the embodiment of FIG. 4b, the rigid framework (21) has a width sufficient to house a single line of holes through which the fixing elements that join it to the blade shell pass. Thus, the central elastic part (20b) is wider than the rigid framework (21) which is made up of a thin layer of glass fibre. The rigid framework (21) covers at least two sides of the elastomeric material and in other embodiments not shown in the figures it can cover all the sides. The rigid framework (21) and the elastomeric material are joined with adhesive or clip-type fastening elements or similar.

Figure 4A:
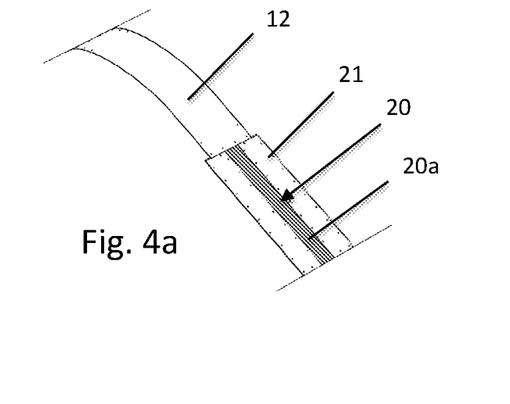
FIG. 4a shows an embodiment of the invention centred on the trailing edge fairing.
Figure 4B:
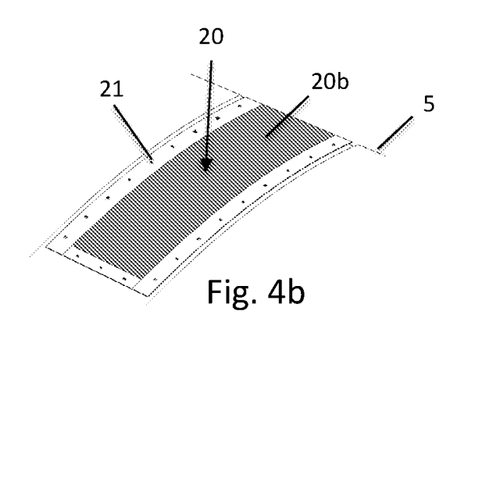
FIG. 4b shows an embodiment of the invention centred on the trailing edge fairing.
Figure 4C:
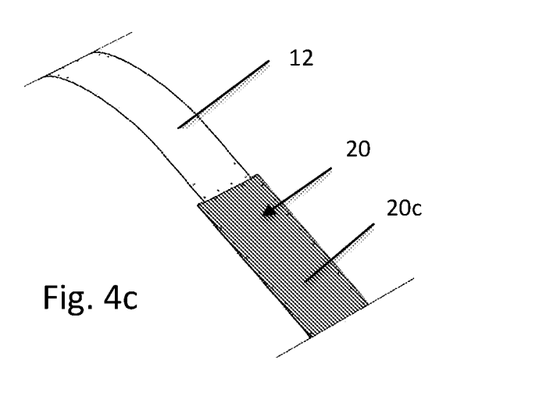
FIG. 4c shows an embodiment of the invention centred on the trailing edge fairing.
Figure 4D:
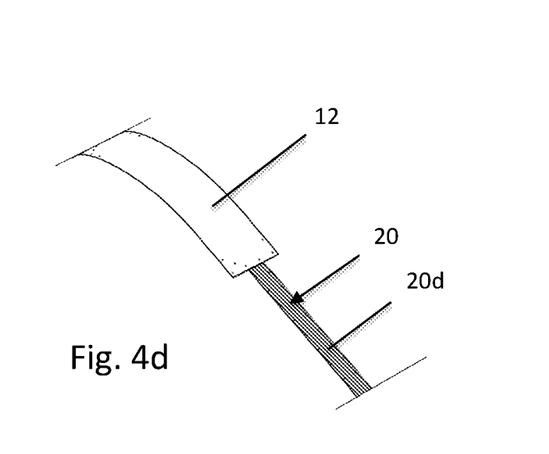
FIG. 4d shows an embodiment of the invention centred on the trailing edge fairing.

In the embodiment of FIG. 4c, the trailing edge fairing (20) is entirely formed by an elastomeric material (20c) that covers the entire hole (10) that it covers. The rigid framework (21) is below the elastomeric material (20c). The embodiment of FIG. 4d shows a trailing edge fairing (20) made entirely of elastic material (20d) and of lower width than the rigid suction side fairing (12).

Figure 5:
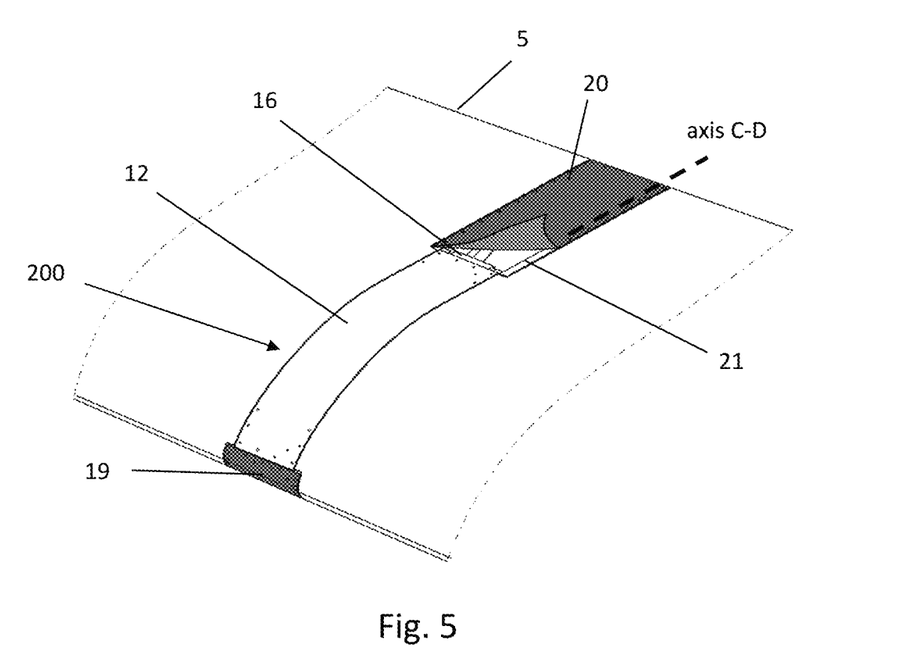
FIG. 5 shows a perspective view of the fairing with a detail of the configuration of the trailing edge fairing.

FIG. 5 shows in detail the fixing of the trailing edge fairing (20) formed entirely of elastomeric material. Incorporated in the suction side fairing (12) is the tab (16) to join the fairing (20) and another tab (not shown) to join the leading edge fairing (19). The rigid framework (21) is arranged below the elastomer material of said fairing (20). The rivet-type fixing elements go through the fairing (20) made of elastomeric material and the rigid framework (21) of glass fibre with perimeter metal inserts or bushings to be fixed in the setback (11) of the blade shell. For their part, the rigid fairings on the suction side (12) and on the pressure side (13) incorporate a copper or aluminium mesh to equipotentially bond said fairings when joining the lightning down-drop. The copper or aluminium metal mesh is intertwined between the layers conforming the hulls.

FIG. 3b shows that there are two trailing edge fairings: an upper fairing (20') and a lower fairing (20") that are joined at their ends. The trailing edge fairing (20) in its different configurations always has a rigid framework (21) that supports the elastomeric material, either peripherally surrounding the elastomeric material (20a; 20b) or arranged on said elastomeric material (20c; 20d). The joint on one of its sides of the upper fairing (20') and the lower fairing (20") conforms the final fairing (20).

Figure 6:
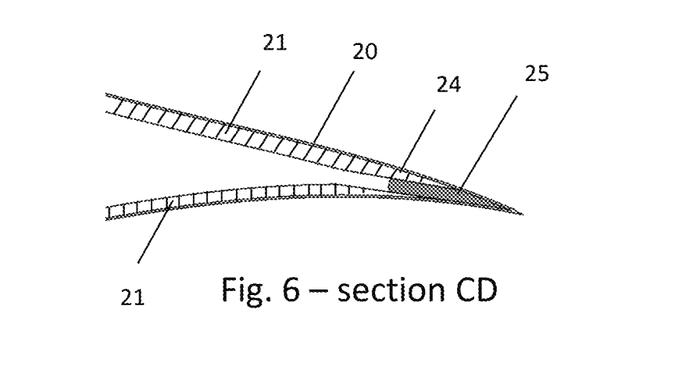
FIG. 6 is a detail of the joint of the fairing trailing edge, on a section along the CD axis of FIG. 5.

Each half of said fairings (20', 20") is joined at one end to the suction side fairing (12) and to the pressure side fairing (13) respectively, joining both halves at their free ends, as can be seen in FIG. 6. The thickness (24) of the frameworks (21) of each of the halves decreases towards the free end of the trailing edge fairing (20), joining the thinner ends of the frameworks (21) of each half by means of an adhesive (25) so that no steps are formed.

The invention claimed is:

1. A fairing for a modular blade of a wind turbine generator, comprising a joining zone disposed between two consecutive modules of the modular blade wherein the fairing comprises:
   a rigid suction side fairing configured to be arranged on a suction side of the modular blade;
   a rigid pressure side fairing configured to be arranged on a pressure side of the modular blade, comprising a metal mesh configured to equipotentially bond the fairing with a lightning cable and a plurality of holes distributed at both ends of the rigid pressure side fairing to house fixing elements which are configured to allow attachment to a shell of the modular blade;
   a leading edge fairing cooperating with a first end of the rigid suction side fairing and with a first end of the rigid pressure side fairing; and
   a trailing edge fairing cooperating with a second end of the rigid suction side fairing and with a second end of the rigid pressure side fairing, wherein both the leading edge fairing and the trailing edge fairing comprise an element of elastomeric material and a rigid framework of glass fiber that supports the element of elastomeric material, each rigid framework comprises peripheral holes that comprise metal inserts or bushings that are passed through by fixing elements that are configured to allow the fairing to be joined to the shell of the modular blade and the metal inserts or bushings are configured to equipotentially bond the fairing with the lightning cable, and
   the width of the fairing is configured to cover a joining zone of the modular blade of between 0.5 and 1% of a length of the modular blade.

2. The fairing according to claim 1, wherein the leading edge fairing is joined to a corresponding end of the rigid suction side fairing and to a corresponding end of the rigid pressure side fairing through a first tab, and the trailing edge fairing is joined to corresponding opposite ends of the rigid suction side fairing and the rigid pressure side fairing through a second tab.

3. The fairing according to claim 1, wherein the element of elastomeric material comprises a width less than a width of the rigid suction side fairing and a width of the rigid pressure side fairing.

4. The fairing according to claim 3, wherein the rigid framework of the trailing edge fairing surrounds at least two sides of the element of elastomeric material, or is arranged below the element of elastomeric material, and the rigid framework is configured to cover a setback of the shell of the modular blade.

5. The fairing according to claim 4, wherein when the rigid framework is arranged below the element of elastomeric material, the metal inserts or bushings passed through by the fixing elements are arranged in the corresponding framework and pass through the element of elastomeric material.

6. The fairing according to claim 3, wherein the width of the rigid suction side fairing and the rigid pressure side fairing is the same.

7. The fairing according to claim 1, wherein the element of elastomeric material of each trailing edge fairing comprises a width greater than or equal to a width of the rigid suction side fairing and a width of the rigid pressure side fairing.

8. The fairing according to claim 7, wherein the rigid framework of the trailing edge fairing surrounds at least two sides of the element of elastomeric material or is arranged below the element of elastomeric material, and the rigid framework is configured to cover a setback of the shell of the modular blade.

9. The fairing according to claim 1, wherein the rigid framework surrounds at least two sides of the element of elastomeric material.

10. The fairing according to claim 8, wherein, when the rigid framework is arranged below the element of elastomeric material, the metal inserts or bushings passed through by the fixing elements are arranged in the corresponding framework and pass through the element of elastomeric material.

11. The fairing according to claim 1, wherein the rigid framework of the leading edge fairing surrounds both sides of the element of elastomeric material or is arranged below the element of elastomeric material, and the rigid framework is configured to cover a setback of the shell of the modular blade.

12. The fairing according to claim 1, wherein the rigid framework comprises a width sufficient to house the peripheral holes through which the metal inserts or bushings pass which allow the joining of the rigid framework to the shell of the modular blade.

13. The fairing according to claim 1, wherein the trailing edge fairing is formed by two halves that are joined at free ends, each half comprising the rigid framework and the element of elastomeric material.

14. The fairing according to claim 13, wherein the framework of each half of the trailing edge fairing comprises a thickness that decreases toward a free end of the trailing edge fairing, joining thinner ends of the frames of each half of the trailing edge fairing by means of an adhesive so that steps are not formed.

15. The fairing according to claim 1, wherein metallic meshes of the rigid suction side fairing and of the rigid pressure side fairing are made of copper.

* * * * *